June 5, 1951 H. O. PETERSON ET AL 2,555,557

DIVERSITY RECEIVER

Filed Feb. 25, 1947 3 Sheets-Sheet 1

INVENTORS
HAROLD O. PETERSON
& GRANT E. HANSELL
BY H.S. Grover
ATTORNEY

INVENTORS
HAROLD O. PETERSON
& GRANT E. HANSELL
BY H. S. Grover
ATTORNEY

DIVERSITY RECEIVER

Filed Feb. 25, 1947 3 Sheets-Sheet 3

INVENTORS
HAROLD O. PETERSON
& GRANT E. HANSELL
BY H. S. Grover
ATTORNEY

Patented June 5, 1951 2,555,557

UNITED STATES PATENT OFFICE 2,555,557

DIVERSITY RECEIVER

Harold O. Peterson and Grant E. Hansell, Riverhead, N. Y., assignors to Radio Corporation of America, a corporation of Delaware Application February 25, 1947, Serial No. 730,770

2 Claims. (Cl. 250—8)

Figure 1:
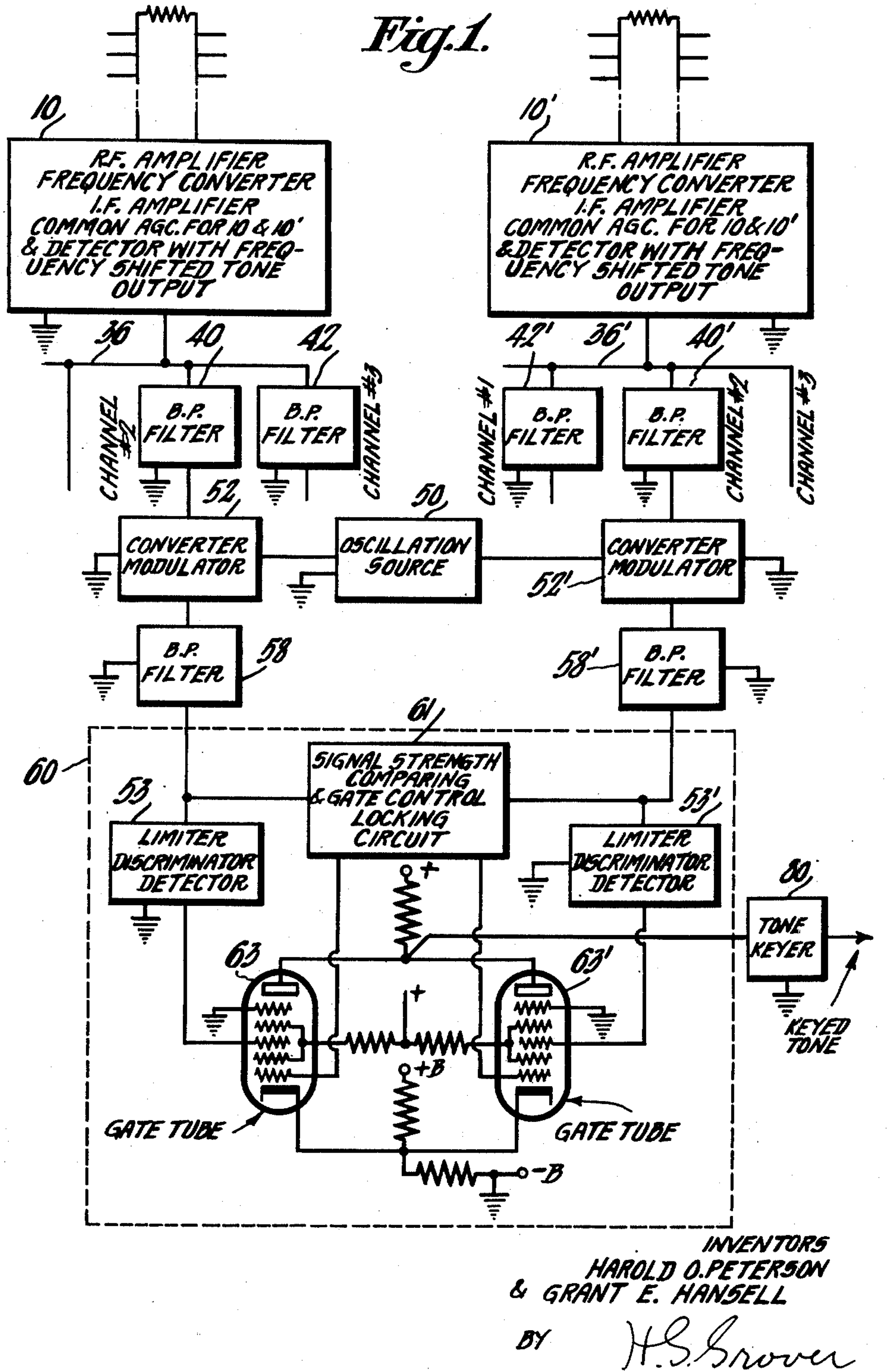

This application discloses an improved method of and means for receiving and amplifying telegraphy signals represented by audio tones, the frequency of which is shifted in accordance with signals. The invention is applicable to single channel systems and to high speed systems such as four or eight channel multiplex printer operations, with or without time division multiplexing on the several channels.

The primary object of our invention is an improved method and means for selecting, amplifying, demodulating and relaying for recording purposes, frequency shift tone telegraphy signals which may or may not be multiplexed by time division.

In frequency shift telegraphy at the transmitter, wave energy is shifted in accordance with signals from a first frequency representing mark to a second frequency representing space and vice versa. The wave frequencies are separated sufficiently to permit segregating the same. The shifted wave energy may be of high frequency or of intermediate frequency which is then beat with high frequency oscillations and a side band selected for radiation. At the receiver, diversity effects are made use of to reduce the effects of fading caused by multipath transmission. Several receivers with spaced aerials or aerials having different radiant energy interception characteristics or both are used and means are provided to select signal from that receiver getting the best signal. A system of this type is shown in Schock et al., U. S. Serial #632,978 filed December 5, 1945, now Patent #2,515,668, dated July 18, 1950. In the said system, the two signal versions are compared in a differential rectifier and thereby a potential is provided which controls the state of stability of a trigger circuit to turn on that gate tube excited by that receiver having the best signal. Tests show that less printing errors occur when the trigger circuit control potential network has a fast time constant. These time constants were:

"Fast"=2 milliseconds
"Medium"=200 milliseconds
"Slow"=2000 milliseconds

Testing with a single five-unit printer circuit on signals transmitted from Bolinas (KLR at 10090 kc.) to New York, the following error counts were obtained:

With "Fast" time constant—6 errors per 9030 letters
With "Medium" time constant—24 errors per 9030 letters With "Slow" time constant—52 errors per 9030 letters These results indicate quite positively that it is desirable to use a fast time constant for the gate control.

One of the limitations to making a fast time constant in the gate control circuit is the need for smoothing off the channel frequency ripples, in the output of the differential rectifier in the signal strength sensing circuit which supplies the potential to control the gating tubes to pick for use the best signal.

In the system described in said application, signal strength sensing and selection took place at a frequency sufficiently high to permit filtering out the channel ripple without using circuit constants which limit the speed at which channel selecting by switching takes place.

In some installations, a transmitter as used in telephony sends out a high frequency carrier amplitudes modulated by a plurality of tone frequencies each of which is shifted in frequency in accordance with different signals. In other cases, pairs of tones may be shifted in frequency by the same signal and used to modulate the high frequency carrier. In such a system, the shifted tones are recovered at the receiver for recording purposes. We wish to use the improved signal strength sensing and selecting means of the said prior application to select in each channel for recording purposes the best frequency shifted tone. However, where selection is required at tone frequency, the problem discussed above becomes much more severe.

If the keyed tones from the different channels of the system are compared as to strength, the filter networks necessary to remove the audio ripples would have relatively slow time constants. The control potential derived by the signal sensing detectors would be ineffective to operate the triggering circuit for gate control purposes fast enough to select "mark" characters from one channel and "space" characters from the other channel.

An object of our present invention is to provide improved means for selecting from two or more keyed tones, which are different versions of the same signal such as might be obtained in the detector outputs of single or diversified receivers, that tone which is of the best strength and to do so at a rate sufficiently high to select "mark" characters from one channel and "space" characters from the other channel.

Figure 2:
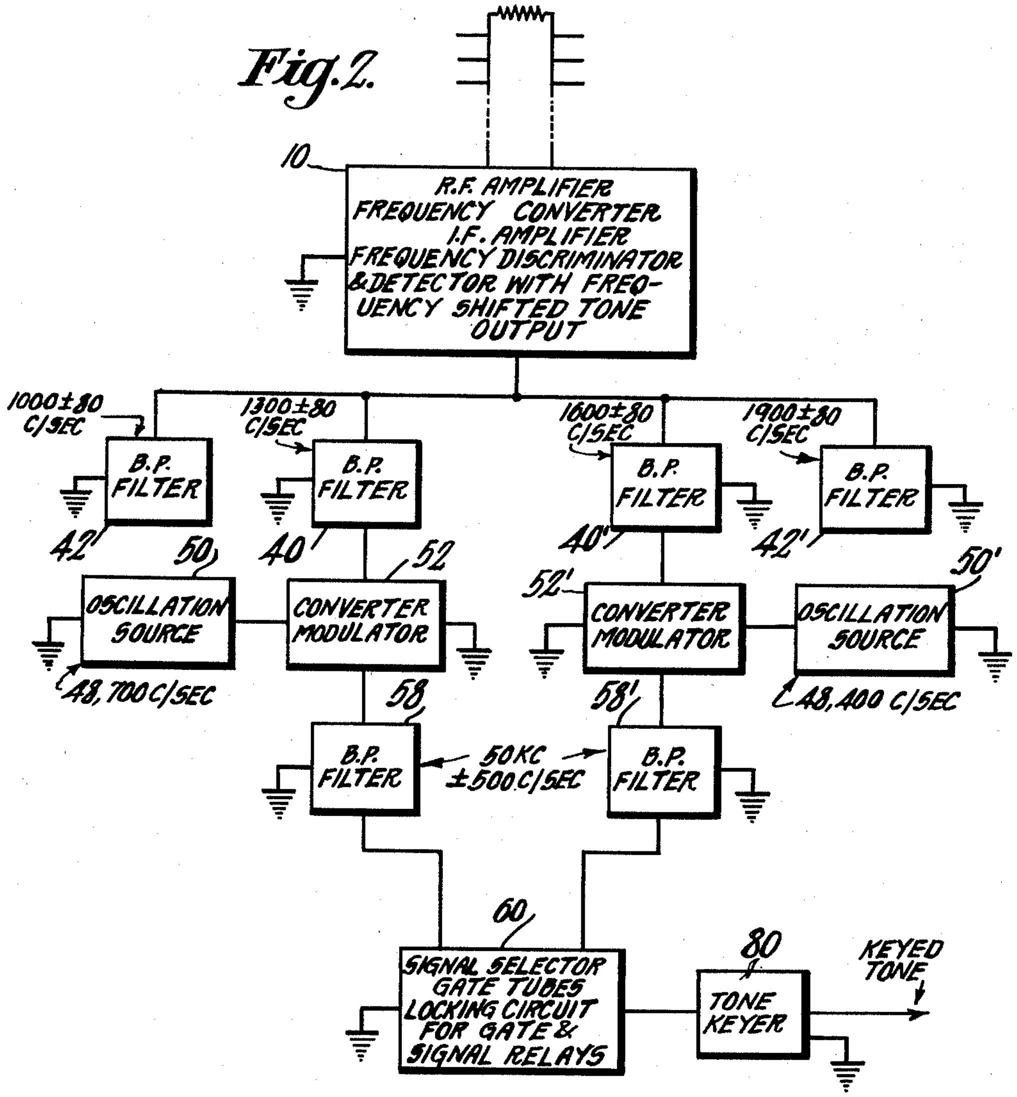
Figure 3:
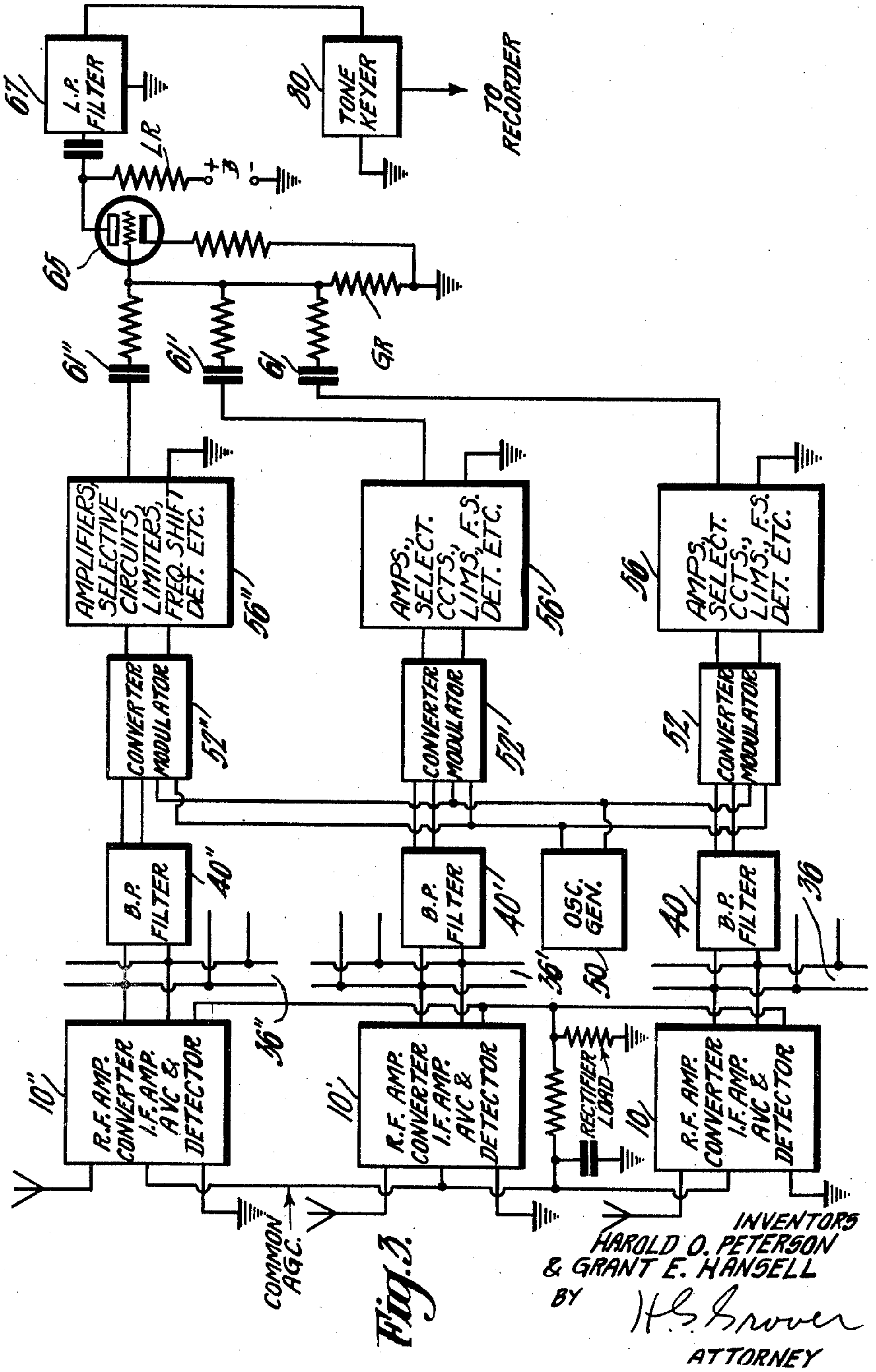

In describing our invention in detail, reference will be made to the attached drawings, wherein the three figures each show our improved means for conditioning tone telegraphy signals of the frequency shift type for recording purposes. In the embodiment of Fig. 1, our invention is used with a two receiver diversity supplying the several keyed tones as output. In the frequency diversity embodiment of Fig. 2, a single receiver supplies keyed tones of different frequencies as output. In the embodiment of Fig. 3, receivers in triple space diversity are used to derive the keyed tones.

In one system of multiplex operation, a number of different tone channels are transmitted by a radio telephone transmitter which may be of either the double side band or single side band variety using either amplitude modulation or phase modulation in the double side band transmitter with receivers provided to accommodate whatever form of modulation is being transmitted. For reception, a plurality of receivers are provided, connected to independent spaced antennas. The receivers may be of the dual diversity type, and in fact, may be substantially as illustrated in Peterson U. S. application, Serial #634,350, filed December 11, 1945. The transmitted wave might comprise a carrier on which a plurality of tones are modulated, the tone frequencies being shifted in accordance with signals to represent "mark" and "space." In the drawings and in the above mentioned application, it is assumed that at least four channels of which three are shown, are used so that at least four tones shifted in frequency between mark and space are derived at the receiver outputs. The receivers of rectangles 10 and 10′ may then be about as illustrated in Fig. 1 of the drawings of said application and may include all of the apparatus illustrated and other elements known in the art to supply from detectors to lines 36 and 36′ corresponding to lines 36 and 36′ of the said application, a plurality of tones, the frequencies of which shift in accordance with signals. In an example given, channel 1 might operate at 1450 cycles, ±80 cycles. Channel 2 might operate at 1650 cycles ±80 cycles and channel 3 might operate at 1850 cycles ±80 cycles. Furthermore, time division multiplexing may take place on each channel so that a large number of printer circuits may be handled by the several tone channels.

Each audio tone channel is frequency shift modulated by telegraph signals which may, for instance, be four channel time division printer signals. These different tone channels are selected by band pass filters 40, 42, 40′ and 42′, etc. in the outputs of each of the diversity receivers. In the drawings, for the sake of simplicity, we have shown two band pass filters coupled to the output of each receiver. The additional band pass filters are connected in the same manner. The remaining apparatus in the figure is the improved means of the present invention for processing the tone signals derived at the receiver outputs in such a manner as to use that signal from that receiver in which the particular tone frequency is strongest at any moment.

To obtain the benefits of space diversity reception by a receiver as illustrated in Fig. 1, means must be provided for selecting tone output from that receiver having the strongest tone at the moment. Furthermore, it has been found by measurements that best results are obtained if a very fast switching device is used so that, for instance, the mark signal may be taken from one receiver and the space signal from the other receiver. This has been explained above and means that the switching control must operate in a length of time which is short compared to the length of one band. When 4-channel time division multiplex is being transmitted the length of one band is approximately six milliseconds and it is therefore desirable for the switching operation to function completely in less than one millisecond. A signal strength sensing and receiver output switching means sufficiently fast to operate at this required speed has been disclosed in Schock et al. patent previously mentioned.

If we use rectified tone voltage for controlling the switching operation, we find it difficult to filter off the tone frequency ripple, and yet have a time constant in the gate control network which is on the order of one millisecond.

It is easier to filter off from the rectifier output the ripple frequency if the shifted tone is of higher frequency and, therefore, in accordance with our invention, we propose to heterodyne the tone frequency up to a higher frequency, say for example, on the order of 50 kc. Then the signal strength sensing circuits and connections may have filters sufficiently slow to filter off the intermediate frequency ripple and still fast enough to select the strongest signal, even if the switching operation needs to be so fast that mark is selected in one receiver and space from the other receiver.

In the drawings, a local oscillator 50 supplies output to two converters or modulators 52 and 52′. Additional converters, not shown, are supplied for the other channels of the system. The oscillations of source 50 are mixed with the frequency shifted tones in the converters 52, 52′ to supply higher frequency outputs to filters 58, 58′. Filters 58, 58′ may be of the band pass type and the modulated frequency shifted energies are supplied to signal strength sensing and detecting means cooperating with signal gating means to select signals from the channel having the strongest signal. In the example given above the filters 58, 58′ etc. may have a pass band of 50 kc. ±500 c/sec. or less. The modulators 52 and 52′ may be of the balanced carrier suppressor modulator type or any other suitable type. The upper or lower side band may be selected by the filters 58 and 58′.

Any signal strength sensing and selecting means with signal gating means controlled thereby may be used. In the embodiment illustrated, we prefer to use a signal strength sensing and detecting arrangement as shown in the said Schock et al. patent, for producing a control potential to operate triggering circuits in turn controlling gating tubes, all as disclosed in said patent. The gate control circuit of said patent operates at 50 kc. and can be made sufficiently fast to switch at signalling speeds. Rectangle 60 is then to include signal strength sensing means for deriving the gating control potential, the trigger control tube, the triggering circuit in unit 61, the gating tubes 63 and 63′ etc., comprising elements included in the dotted rectangle of Figure 1 of said patent or so much thereof as is needed to supply the keyed output. The output of the gating tubes may be of signal frequency, assuming that detection takes place before the signals are applied to the gate tubes, as shown here and in said application, or the output of the gating tubes may be of intermediate frequency, in which case gating takes place before detection and a detector follows the gate tubes. The units 53 and 53' include the discriminators and detectors. The essential feature, however, is to raise the frequency of the keyed tones to a higher frequency before subjecting the same to the signal sensing detection operation.

The resulting keyed signal may be used directly for recording purposes, or may be supplied to a tone keyer 80 which in turn operates a recording means such as a teletypewriter. The tone keyer may be as illustrated in Peterson et al., U. S. application Serial #630,428, filed November 7, 1945, now abandoned.

Our invention is also applicable to systems wherein frequency diversity only is made use of. For example, two tones of different frequencies are frequency shifted in accordance with the same signal and the several tones are then used to amplitude modulate a carrier. Then a single receiver system as shown in Figure 2 may be used. The receiver may be like that at 10' in Figure 1, supplying as its detector output the several frequency shifted tones. For example, the keyed tones might be of 1000 cycles ±80 cycles, 1300 cycles ±80 cycles etc. Filters 40, 42, etc. are used to isolate or separate out the various tones, and the two tones keyed by the same signal are converted, in accordance with our invention, to higher frequencies and then applied to the signal strength selecting means. Separate oscillators 50 and 50' are now used and may operate at 48,700 and 48,400 cycles/sec. respectively. The band pass filters 58 and 58' select the frequency shifted signals of higher frequency and feed them to a signal selector and frequency shift detector 60, which may be like the apparatus in unit 60 of Figure 1. The detected output may again be fed to a tone keyer 80. The operation is as described in connection with Figure 1. Other frequency converters are connected in like manner to the other pairs of tone filters passing tone frequency waves keyed by the same signals.

Our invention is not limited to the use of diversity systems of the type wherein two versions of the signal only are used. On the contrary, we propose to use our system with receivers in triple diversity. Furthermore, the signal strength sensing circuits in the rectifiers in which is produced the control potential for diversity switching or selecting, may be of any appropriate type, various ones of which are known in the art. For example, our invention may be applied to triple diversity systems using three receivers, somewhat as illustrated in Peterson Patent #2,290,992. Moreover, gating may be accomplished somewhat as illustrated in Figure 3 of said patent. Such a system including our invention, would then be substantially as disclosed in Figure 3 of the drawings. In this figure, there are three receivers 10, 10' and 10'', each including an aerial or other signal pick-up means, radio frequency amplifiers, a source of oscillations (one source for each receiver but preferably a common source for all of the receivers) and converting detectors wherein the received signal is reduced in frequency to an intermediate frequency. Said receivers may also each include an intermediate frequency amplifier and a detector with common automatic gain control circuits, if desired. The receivers here may be as illustrated in the said Peterson patent or in said Peterson application, Serial #634,350 filed December 11, 1945. The various tone frequencies in the multiplex transmitting system might be impressed as amplitude modulation on a carrier, in which case the receiver has an amplitude modulation detector in the output of which the various keyed tones appear. These frequency shifted tones appear in lines 36, 36' and 36'' for selection by filters, as in the arrangement of Figure 1. In the arrangement of Figure 3, a single filter is shown connected with each of the lines 36, 36' and 36''. These band pass filters have been designated 40, 40' and 40''. The selected tone frequencies are impressed on converter modulators 52, 52' and 52'', also excited by oscillations from the oscillation source 50. The outputs from the converters are impressed on selective circuits 56, 56' and 56'' which include band pass filters, tuned to the upper or lower side frequencies, amplifiers and frequency shift detectors. The detectors convert the frequency shifts in tone frequency into correspondingly varying potentials having a strong direct current component. These potentials are fed by way of capacitors 61, 61' and 61'' and coupling resistors to the control grid of a coupling tube 65. The capacitors 61, 61' and 61'' remove the direct current components, to supply alternating potentials to the control grid of the tube 65. The tube 65 has its cathode connected to ground by a resistor and has a grid biasing resistor GR which operates to supply output from that detector only to which is being fed the best signal at that particular instant. To do this, the resistor GR supplies to the control grid of tube 65 a high negative potential, so that the same is biased to cut-off for all applied potentials except that signal potential from that one of the three receivers having the greatest magnitude. For example, if there is a strong signal supplied by detector 56 and weaker signals by the other detectors, the negative potential supplied by GR to the grid of tube 65 is high enough so that this tube remains at cut-off with respect to the weaker signals. However, the stronger signal from detector 56 overcomes this negative bias so that the tube 65 responds to the signal at that instant, causing current to flow in the tube. If at the next instant, this signal in 56 becomes weaker and that supplied by detector 56' becomes stronger, the latter signal takes over because the signal in the current amplitude limiter of this channel is strong enough to produce limiting action and takes over to supply tube 65 and makes its grid potential more negative to cut off signal from the weaker channels. In other words, the three input levels to the tube 65 are adjusted such that they are only slightly above the level necessary to produce limiting in the current amplitude limiters feeding the frequency shift detectors. Then, as a given signal fades, it will drop below the level required for limiting in that channel and the output of the discriminator detector in that channel will drop until that set is not contributing appreciably to the output. The selected output appears in the load resistor LR in the anode circuit of tube 65 and is fed through a low pass filter 67 to a tone keyer 80 and thence to recording means.

What is claimed is:

1. In a frequency shift telegraphy system in which the mark element of a signal is characterized by one frequency and the space element of the same signal is characterized by a different frequency, means for receiving several versions of said signal, said means including means for converting the frequencies of the mark and space elements of the received signal to different tone frequencies in the audio range, so that each signal version is represented by a tone of one frequency for mark and a tone of a different frequency for space, means coupled to the output of said converting means for heterodyning the tone frequencies to corresponding waves of higher frequency, strength comparing means to which the several higher frequency waves are applied, said comparing means including rectifiers for rectifying the waves applied thereto, and filters coupled to the outputs of said rectifiers for removing ripple resulting from the rectification, said filters having such time constants as to enable fast switching between signal versions.

2. In a frequency shift telegraphy system in which the mark element of a signal is characterized by one frequency and the space element of the same signal is characterized by a different frequency, means for receiving several versions of said signal, said means including means for converting the frequencies of the mark and space elements of the received signal to different tone frequencies in the audio range, so that each signal version is represented by a tone of one frequency for mark and a tone of a different frequency for space, means coupled to the output of said converting means for heterodyning the tone frequencies to corresponding waves of higher frequency, strength comparing means to which the several higher frequency waves are applied, said comparing means including rectifiers for rectifying the waves applied thereto, filters coupled to the outputs of said rectifiers for removing ripple resulting from the rectification, said filters having such time constants as to enable fast switching between signal versions, said comparing means functioning to derive a control potential the absolute magnitude of which depends on which of the several waves of higher frequency represents the best version of the signal, a plurality of gating devices, equal in number to the number of signal versions being received, controlled by and responsive to said potential to pass the signal version impressed thereon, means for impressing a different signal version on each gating device, and a common output circuit coupled to said gating devices.

HAROLD O. PETERSON.
GRANT E. HANSELL.

REFERENCES CITED

The following references are of record in the file of this patent:

UNITED STATES PATENTS

| Number | Name | Date |
|---|---|---|
| 1,637,404 | Brown | Aug. 2, 1927 |
| 1,742,773 | Loewe | Jan. 7, 1930 |
| 1,842,898 | Bellescize | Jan. 26, 1932 |
| 1,995,418 | Curtis | Mar. 26, 1935 |
| 2,019,335 | Carter | Oct. 29, 1935 |
| 2,219,749 | Oswald | Oct. 29, 1940 |
| 2,219,751 | Polkinghorn | Oct. 29, 1940 |
| 2,245,385 | Carlson | June 10, 1941 |
| 2,249,425 | Hansell | July 15, 1941 |
| 2,253,832 | Whitaker | Aug. 26, 1941 |
| 2,253,867 | Peterson | Aug. 26, 1941 |
| 2,282,526 | Moore | May 12, 1942 |
| 2,302,951 | Peterson | Nov. 24, 1942 |
| 2,364,952 | Crosby | Dec. 12, 1944 |
| 2,375,126 | Mathes | May 1, 1945 |
| 2,383,126 | Hollingsworth | Aug. 21, 1945 |
| 2,384,456 | Davey | Sept. 11, 1945 |
| 2,407,259 | Dickieson | Sept. 10, 1946 |
| 2,414,111 | Lyons | Jan. 14, 1947 |
| 2,420,868 | Crosby | May 20, 1947 |